United States Patent [19]

Skarman

[11] 4,226,517
[45] Oct. 7, 1980

[54] CAMERA DEVICE

[75] Inventor: John S. Skarman, Corona del Mar, Calif.

[73] Assignee: A 1000 Words Incorporated, North Hollywood, Calif.

[21] Appl. No.: 34,425

[22] Filed: Apr. 30, 1979

[51] Int. Cl.³ .................... G03B 29/00; G03B 9/26; G03B 17/36; G03B 17/42

[52] U.S. Cl. ............................ 354/75; 354/171; 354/206; 354/213; 354/253; 354/265

[58] Field of Search .................. 354/75, 171–172, 354/204–206, 213, 215, 217, 265, 76, 253

[56] References Cited

U.S. PATENT DOCUMENTS

| 590,752 | 9/1897 | Cook | 354/253 |
|---|---|---|---|
| 1,991,146 | 2/1935 | Fuerst | 354/250 |
| 2,047,263 | 7/1936 | Green | 354/253 |
| 2,053,513 | 9/1936 | Blattner | 354/253 |
| 2,186,639 | 1/1940 | Hutchison, Jr. | 354/253 |
| 2,206,532 | 7/1940 | Galter | 354/253 |
| 3,590,711 | 7/1971 | Milanese | 354/213 |
| 3,685,414 | 8/1972 | Good | 354/204 |

Primary Examiner—L. T. Hix
Assistant Examiner—Thomas H. Tarcza
Attorney, Agent, or Firm—Richard H. Zaitlen

[57] ABSTRACT

A simplified compact preloaded camera including a mechanism for automatically advancing the film and resetting the shutter. The camera includes a one-piece molded body having walls which define viewfinder, film supply, film exposure and takeup areas. Film is wound on a pretensioned spring-driven spool which is released after each picture is taken in order to advance the film to the next frame. A simple shutter mechanism is included, and both the resetting of the shutter mechanism and film advancement are controlled by a single spring. The camera is designed to be used while in a box. When a roll of film is completed, the box is sealed shut and mailed to the processor.

9 Claims, 8 Drawing Figures

CAMERA DEVICE

BACKGROUND OF THE INVENTION

1. Field of the Invention

This invention relates to compact cameras. More particularly, this invention relates to a simplified preloaded compact camera having an automatic film advance.

2. Description of the Prior Art

The idea of "preloaded" cameras is not new. In fact, some early box cameras developed in the late 1800's were preloaded with a 100 shot roll of film. For developing, the user returned the camera, film and all, to the factory. The manufacturer then processed the film and returned the pictures and the camera reloaded with a new roll of film to the customer. The reason for this was that the technology at that time was not developd to an extent which would permit the camera user to remove the film himself and send it in for processing.

Recently, the idea of using a preloaded camera and sending the camera and film to the manufacturer for processing has been suggested not because of technical limitations, but rather as a matter of convenience. Rather than having to purchase the camera and film separately, a photographer simply would buy a camera which is preloaded with film, take his pictures, and then send the entire camera back to the factory for processing. The film is developed and the photographer is sent his pictures. The camera is reloaded at the factory and recycled into the marketplace. In effect, the photographer is merely "renting" the camera and is buying film and processing. The need for an initial investment in a camera is therefore eliminated. Such a system is especially convenient for a person who already owns a camera but does not have it with him at some particular time when he wants to take pictures. Rather than having to decide between buying another camera (even if relatively inexpensive), one would simply purchase a preloaded camera, thus enabling him to take a roll of pictures without purchasing a separate camera. Since the preloaded camera is recycled by the manufacturer, the photographer pays only for film and developing.

Up until now however, cameras of the above type have not been successful for a number of reasons, including their complexity and resultant high initial cost of manufacture. One way of achieving simplicity of construction is to provide the camera with manual film advance. However, it is much more desirable that the film be advanced automatically after each picture is taken, thus preventing the possibility of double exposures and simplifying operation. One preloaded camera incorporating an automatic film advance is described in U.S. Pat. No. 3,685,414 issued to P. Good on Aug. 22, 1972. Although this camera meets the basic requirements of the returnable camera discussed above, it is relatively complex and thus expensive to manufacture. Since a recyclable camera does not have an unlimited lifetime and since not all of the cameras will be returned to the factory (due to loss, destruction, etc.), it is critical that the initial cost of the manufacture of the camera be as low as possible in order to minimize losses caused by the nonrecycling of cameras.

Therefore, it is a primary object of this invention to provide a preloaded compact camera having an automatic film advance mechanism which may be economically manufactured.

It is a further object of this invention to provide a camera which is both light enough in weight and sturdy enough in construction so as to permit it to be inexpensively and safely sent through the mails.

It is another object of this invention to provide a mailing container or system from which the camera need not be removed in order to take pictures.

SUMMARY OF THE INVENTION

These and other objects are accomplished by providing a camera having a molded plastic body which includes several integrally molded components. The body, whose shape is generally that of a rectangulr box, has an open top and a partially open back. It includes upstanding walls which define a view finder, film supply, film exposure and film takeup areas. The front and rear walls of the view finder area have view finer openings and the front wall of the film exposure area has an aperture for providing a picture taking light path. A post in the film supply area functions as a supply spool for a roll of film. The film takeup area includes a molded support shaft for supporting a cylindrical film takeup spool. A spring tension post is also molded in the film takeup area in a location so that it is positioned inside the film takeup spool.

The takeup spool includes a drive spring located in its interior which is pretensioned and is biased against the spring tension post. The takeup spool has a spiral groove on its top which includes a plurality of molded locking projections. The takeup spool is normally held in a stationary position by means of a locking spring which engages one of the locking projections. After a picture has been taken, the locking spring is temporarily released from engagement with the locking projection, thus enabling the pretensiond drive spring to cause the takeup spool to rotate until the locking spring engages the next locking projection in the spiral groove.

A simple shutter mechanism is included which is automatically reset after a picture has been taken. Both the resetting of the shutter and the advancement of the film takeup spool is initiated by a single spring. The advancement of film and resetting of the shutter is thus accomplished simply and smoothly.

A plastic cover portion covers the open top and back of the body and facilitates access to the film in the camera. A pair of clips can be utilized to secure the cover to the body. The camera may be located in a mailing box and is designed to be used without requiring removal from the box. In use, the front of the box is opened to expose the lens, shutter release and viewfinder opening of the camera. When the complete roll of pictures has been taken, the box is simply sealed shut with an adhesive label and mailed to the manufacturer for processing.

DETAILED DESCRIPTION OF THE DRAWINGS

Figure 1:
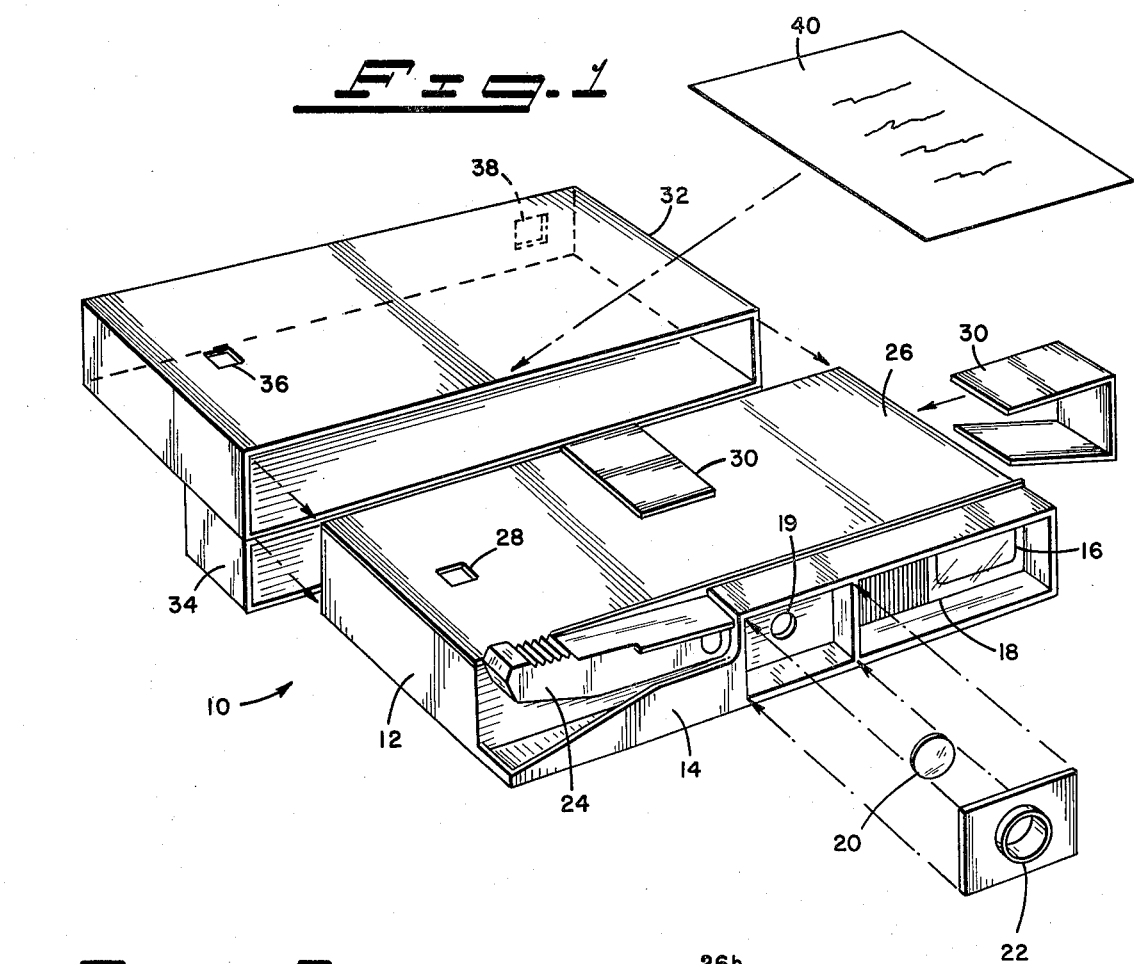
FIG. 1 is a front perspective view of the camera of the present invention including the box within which the camera is located.

Referring to FIG. 1, a camera 10 includes a body 12 which is made of molded plastic. The body 12 has a front 14 which includes a front viewfinder opening 16. A transparent plastic viewfinder window 18 covers the opening 16 and is held in place in the body 12 by means of friction. Near the middle of the front 14 is an aperture 19 which permits the entry of light into the camera body 12 for purposes of film exposure. The aperture 19 is covered by a lens 20 which is held in place by a lens frame 22. As is the case with the viewfinder window 18, the lens frame 22 is held to the body 12 by means of friction, thus obviating the need for any type of adhesive. A shutter lever 24 is also located on the front 14 near the lens 20. Covering the body 12 is a molded plastic cover 26 which includes a picture number window 28. The cover 26 is held to the body 12 by means of a pair of clips 30, which may be made of metal or other suitable material.

During normal operation, the camera 10 is located within a box 32. The box 32 includes a hinged cover portion 34. When the cover portion 34 is opened, the front 14 of the camera 10 is exposed, including the shutter lever 24. A window 36 is located on the box 32 in a position corresponding to the window 28 on the cover 26. A second window 38 is located at the rear of the box 32. Although the box 32 is preferably made of cardboard, other materials, such as plastic, would also be suitable. After a roll of film in the camera 12 has been completely exposed, the cover 34 is reclosed and an adhesive label 40 is placed over the box 32 and cover 34 in order to secure the cover 34 in its closed position. The box 32, which can be preaddressed and stamped, is then mailed to the developer. The label 40 can be conveniently utilized to indicate the return address to which developed pictures should be mailed. In another embodiment, the camera 10 is sealed in the box 32 and then placed in a separate mailing envelope.

Figure 2:
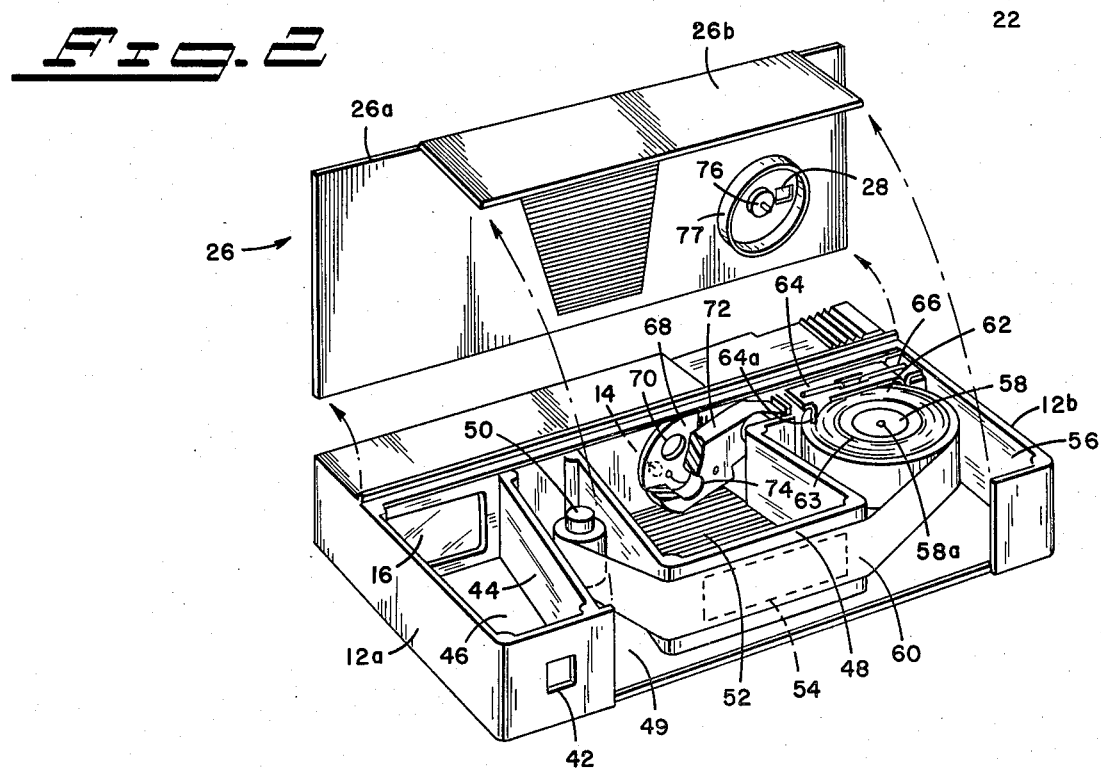
FIG. 2 is a rear perspective view of the camera of the present invention showing the cover removed so as to reveal the interior of the camera.

Referring now to FIG. 2, the cover 26 is more fully shown as having a top portion 26a and a back portion 26b. When the cover 26 is in place on the body 12, the interior of the camera 10 is completely enclosed. On the back of the body 12 is a rear viewfinder window 42 whose location corresponds to the location of the window 38 on the box 32. The body 12 includes an integrally molded wall 44 which, in combination with the outside wall of the body 12, defines a viewfinder area 46. A photographer looks through the rear viewfinder opening 42 in order to view a scene framed by the front viewfinder opening 16. A second integrally molded wall section 48, which is generally U-shaped, is located near the center of the body 12. The space between the wall 48 and the wall 44 defines a film supply area 49, within which is located an integrally molded post 50. The function of the post 50 is to position a roll of film within the film supply area and act as a supply spool.

As well as serving to partially define the film supply area 49, the wall 48 also defines within its U-shape a film exposure area 52. The part of the wall 48 near the back of the body 12 includes a rectangular opening 54 adjacent to which a portion of a roll of film 60 to be exposed is located. It should be noted that when the cover 26 is in position, the space between the back portion 26b and the wall 48 is very small and the film 60 is therefore properly positioned against the opening 54 (i.e., the back 26b acts as a pressure plate).

Referring further to FIG. 2, the wall 48 and the side 12b of the body 12 define a film take up area 56 within which is located a take up spool 58. The film 60 moves from the supply post 50 across the opening 54 and to the take up spool 58. Formed in the top of the spool 58 is a spiral groove 62 and a circular groove 63. A molded pin 76 located on the cover 26 fits within an opening 58a in the center of the top of the spool 58 so as to secure the position of the spool 58. A ring 77 is also molded into the cover 26, and fits into the groove 63. A spring lock 64, the function of which will be described subsequently, has a downwardly extending finger 64a which fits into the spiral groove 62. The spring lock 64 is secured to the body 12 by means of a hold down wire 66 which is embedded into the plastic of the body 12. Attached to the inside of the front 14 of the body 12 is a shutter plate 68 which includes a circular opening 70. A trigger arm 72 is rotatably supported between the wall 48 and the front 14 and includes a circular opening 74.

Figure 3:
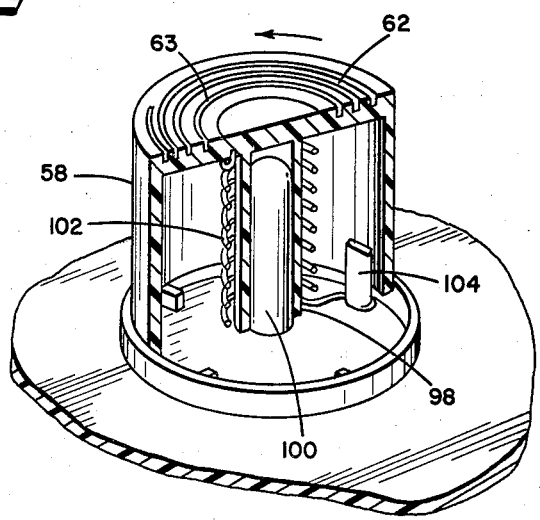
FIG. 3 is a perspective view of the take up spool of the camera, partially cut away to show the spring drive mechanism for the spool.
Figure 4:
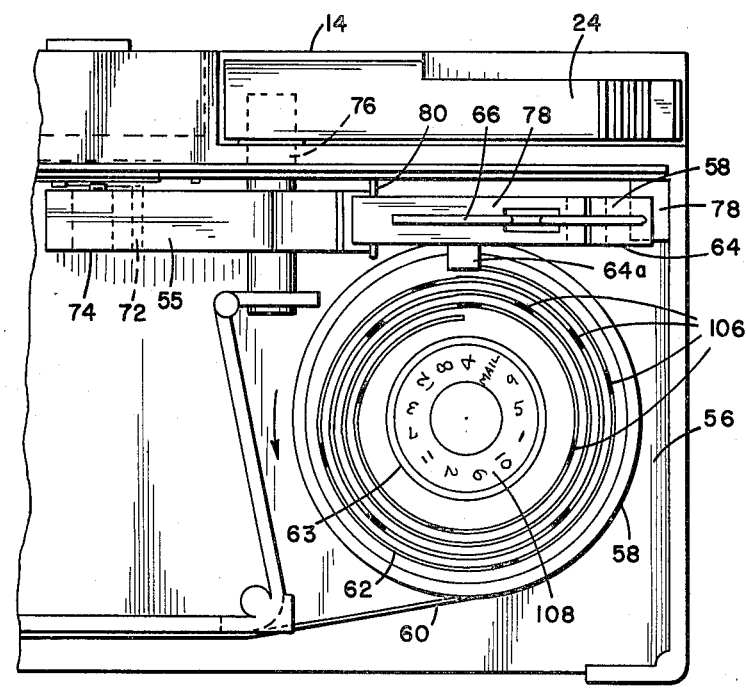
FIG. 4 is a top view of the spool of FIG. 3.
Figure 6:
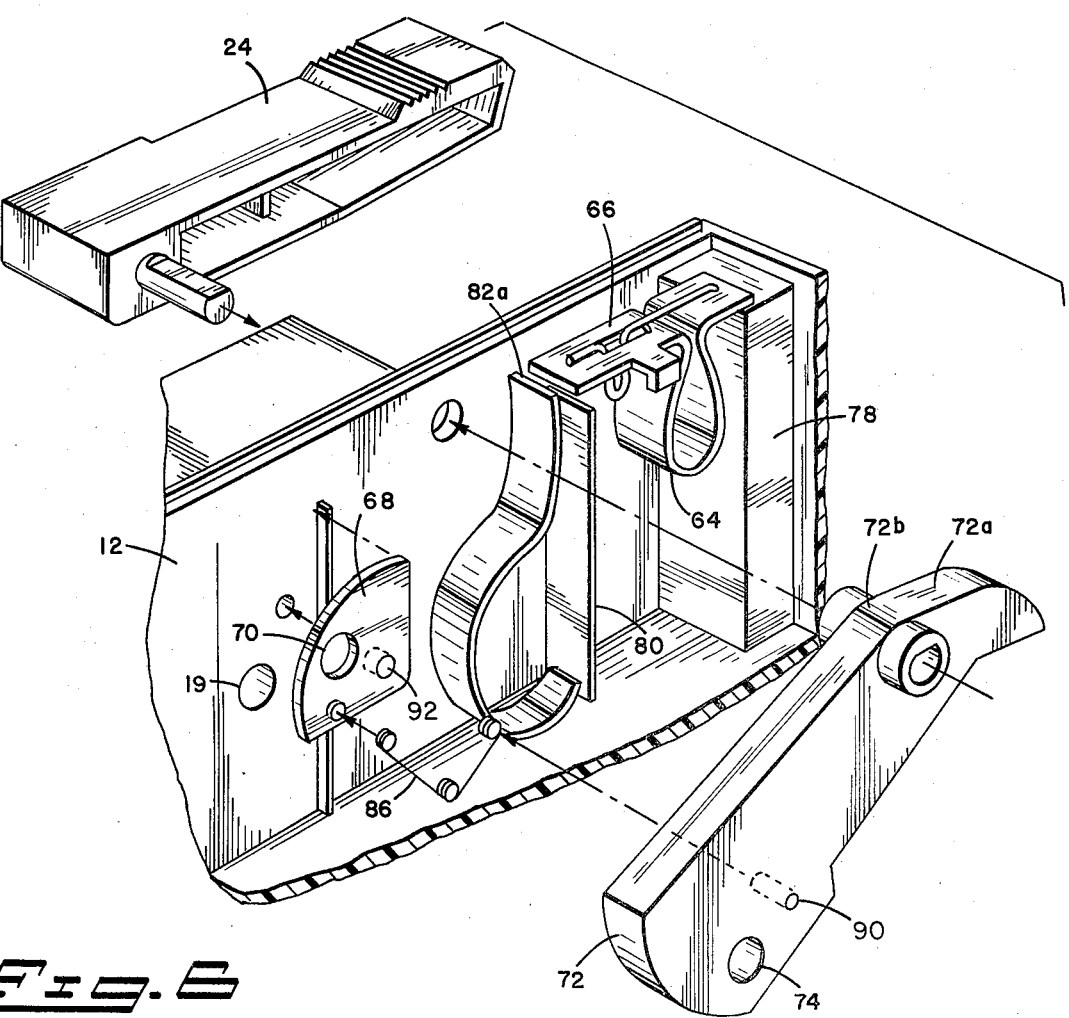
FIG. 6 is a perspective view of the shutter mechanism of the present invention.

Referring now to FIG. 3, the spool 58 includes a post and sleeve arrangement 98 in its interior which is supported on a shaft 100. The shaft 100 is integrally molded with the body 12. One end of a tension spring 102 is secured to the spool 58, and the other end of the spring 102 is biased against a post 104 which is integrally molded with the body 12. The spring 102 is pretensioned and tends to cause the spool 58 to rotate in a counterclockwise direction. Normally, however, such rotation is prevented by the finger 64a of the spring lock 64 which fits into the groove 62. As can be seen in FIG. 4, the spiral groove 62 includes a plurality of integrally molded locking projections 106 which catch the finger portion 64a of the locking spring 64. After each picture is taken, the locking spring 64 is lifted slightly, thus causing the finger 64a to move away from engagement with the locking projection 106. The spring 102 then rotates the spool 58 until the next locking projection 106 is encountered. By this time, the spring lock 64 has returned to its down position and the rotation of the spool 58 will be halted by the finger 64a. Thus, with each subsequent picture the spool 58 will advance the distance between one locking projection 106 to the next locking projection 106 in the spiral groove 62 and advance the film 60. The distance between projections 106 is chosen so that one frame of the film 60 is advanced as the spool 58 rotates between adjacent projections 106.

So that the photographer will know what frame in a roll of film is ready for exposure, an exposure number label 108 is included on the top of the spool 58. The label 108 includes a circular array of numerals which is concentric with the spool 58. The numeral which corresponds to the frame which is ready to be exposed is visible through the window 28 in the cover 26 of the camera 10. The label 108, which may simply be a printed paper label having an adhesive backing, will rotate with the spool 58 as the film 60 is advanced. In order to prevent light from entering the film take-up area 56 through the window 28 and damaging the film 60, the spool 58 is provided with the circular groove 63 which surrounds the label 108. As previously described when the cover 26 is in place, the ring 77 fits into the groove 63 (without preventing the rotation of the spool 58), thus maintaining the light tight condition of the film take-up area 56.

Figure 5A:
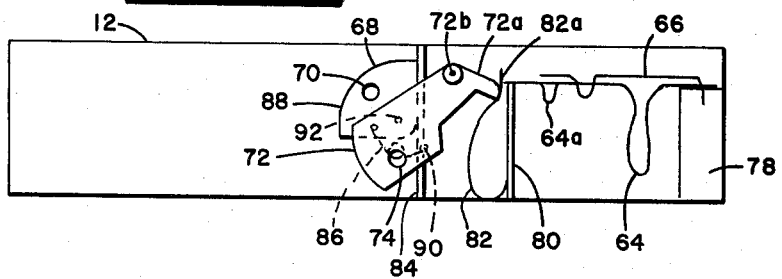
FIGS. 5A, 5B and 5C are plan views of the shutter mechanism of the camera of the present invention.

Referring now to FIGS. 5A, 5B, 5C and 6, the shutter release and film advance operation will be described. As previously described, the spring lock 64 is held in place by means of the hold down wire 66. The wire 66 is embedded into a corner post 78 which is integrally molded with the body 12. When the finger 64a of the locking spring 64 is engaged with a locking projection 106 of the spiral groove 62, the pressure on the finger 64a causes the locking spring 64 to be stretched to the left slightly. The end of the locking spring 64 then just barely extends over the top of a wall 80 which is integrally molded with the body 12. A return spring 82 is positioned adjacent to the wall 80. On the side of the spring 82 opposite the wall 80 is an extension 72a of the trigger arm 72. The trigger arm 72, which is connected to the shutter lever 24, pivots about an axis 72b. As shown in FIG. 5A, the trigger arm 72 is in its down, or set, position. The shutter plate 68 is then in its up, or set position, and biased against a projection or wall 84 which extends along the height of the body 12. The shutter plate 68 is rotatably attached to the body 12 by means of a pin 92. A shutter spring 86 is connected between the shutter 68 and to the trigger arm 72 by means of two pins 88 and 90, respectively.

Figure 5B:
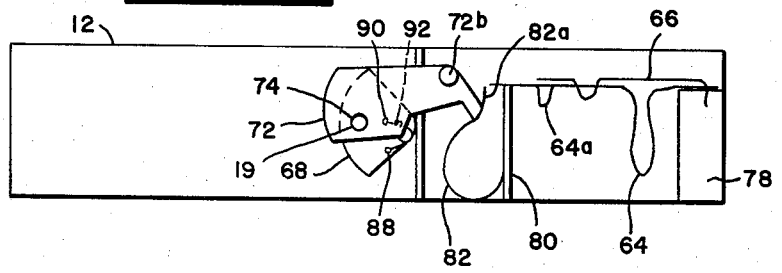
Figure 5C:
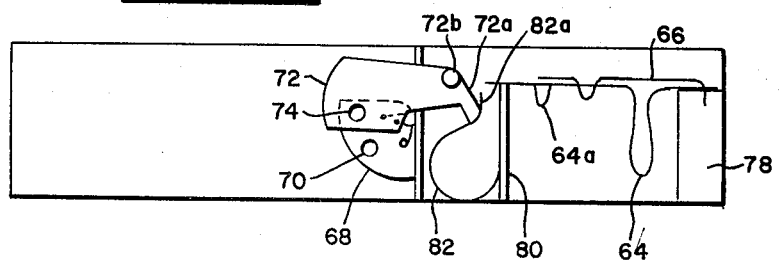

Referring now to FIG. 5B, the position of the trigger arm 72 and the shutter plate 68 as a picture is being taken is shown. As the shutter lever 24 (not shown in FIG. 5B) is pressed down, the trigger arm 72 rotates clockwise, causing the relative positions of the pins 88 and 90 to change. This initially causes the shutter spring 86 to be compressed. As the trigger arm 72 is rotated further, the position of the shutter spring 86 will be such that its downward force will trip the shutter plate 68, forcing it to rotate about the pin 92 from its up position (FIG. 5A) to its down position (FIG. 5C). The position of the opening 74 in the trigger arm 72 at this point corresponds to the position of the aperture 19. Therefore, when the opening 70 in the shutter plate 68 passes the aperture 19, light will be able to pass through the aperture 19, the opening 70 and the opening 74, thus permitting light to pass into the film exposure area 52.

During the time that the shutter 68 is being tripped, the extension 72a begins to compress the spring 82. Once the shutter 68 has rotated down to its completely down position against the lower portion of the projection 84, as shown in FIG. 5C, the spring 82 is fully compressed. When the photographer releases the shutter lever 24, the spring 82 will spring back to its original uncompressed condition. When it does this, it exerts pressure on the extension 72a and pivots the trigger arm 72 back to its original set position. This in turn will cause the spring 86 to rotate the shutter plate 68 back into its up or set position. Since the spring 86 must be recompressed before it will snap the shutter plate 68 back into its up position, the shutter plate 68 will not snap up until the trigger arm 72 has been pivoted downward somewhat. When the shutter plate 68 finally does rotate into its up position, the position of the opening 74 of the trigger arm 72 will no longer correspond with that of the aperture 19. Therefore, during the resetting motion no light will enter the film exposure area 52. The shutter mechanism thus is light tight at all times other than during the tripping of the shutter plate 68.

The action of the spring 82 also serves to initiate the automatic advance of film 60 in the camera 10. As the spring 82 returns from its compressed state to its original uncompressed state, its top edge 82a engages the end of the locking spring 64 which overhangs the wall 80. This lifts the locking spring 64 up slightly, thus freeing the finger 64a from engagement with a locking projection 106 and allowing the spool 58 to rotate and advance the film 60. The top of the spring 82a contacts the edge of the locking spring 64 only momentarily, thus causing the finger 64a to return to engagement with the next locking projection 106 and prevent further rotation of the spool 58. The momentary contact between the top of the spring 82a and the locking spring 64 is due to the fact that when the finger 64a is in contact with a locking projection 106, the force on the finger 64a (exerted by the tension spring 102) causes the spring 64 to stretch and extend over the wall 80. However, when the top of the spring 82a lifts the locking spring 64 out of engagement with a locking projection 106, the spring 64 will return to its original unstretched configuration. This will cause it to lose contact with the top of the spring 82a and thus lower into engagement with the next locking projection 106 in the spiral groove 62.

In summary, the shutter and film advance mechanism of the present invention is a simple device incorporating less than ten elements, in which the spring 82 serves the dual function of both resetting the shutter plate 68 and releasing the locking spring 64 so as to enable the film 60 to advance. The shutter mechanism includes a two position trigger arm 72 having a spring 86 connected between it and the shutter plate 68. As the trigger arm 72 is pivoted from a down position to an up position, the spring 86 causes the shutter plate 68 to trip and rotate from its up position to its down position. The spring 82 then automatically pivots the trigger arm 72 back to its down position, thus resetting the shutter 68. At the same time, the top edge 82a of the spring 82 lifts the locking spring 64, causing the finger 64a to move out of engagement with a locking projection 106 in the spiral groove 62, thus allowing the film 60 to be advanced.

Due to the simplicity of the shutter and film advance mechanism and to the integral molding of several components with the base of the camera, the complete system of the present invention, including the box 32 and film 60, requires fewer than twenty-five parts. The result is a camera which is both light in weight and reliable in operation. These factors make the camera well suited for sending through the mails and for recycling into the marketplace by the manufacturer.

Although a particular embodiment of the invention has been described and illustrated herein, it is recognized that modifications and variations may readily occur to those skilled in the art and consequently it is intended that the claims be interpreted to cover such modifications and equivalents. For example, a button could be used to trip the shutter mechanism instead of the shutter lever 24. In addition, various modifications may be made in the shutter mechanism and film advance mechanism without departing from the scope of the invention. Such variations would include the particular types of springs employed as well as the exact configuration of the different elements of the mechanisms.

I claim:
1. A preloaded automatic film advance camera adapted to facilitate factory reloading and redistribution, comprising:
a one piece molded plastic body including:
(a) walls defining viewfinder, film supply, film exposure and film take-up areas,
(b) front and rear viewfinder openings,

(c) an aperture for providing a picture taking light path within the film exposure area,
(d) a film supply member in the film supply area, and
(e) a spool support shaft in the film take-up area,
a lens covering the aperture;
a hollow cylindrical film take-up spool, rotatably supported on the support shaft and having a spiral groove on its top, said groove having a plurality of locking projections;
a pretensioned drive spring, attached to and disposed within said spool, for rotating the spool;
a supply of photographic film connected between the film supply post and the film take-up spool and passing by said film exposure area;
a locking spring attached to said body within the film take-up area, said locking spring including a downwardly extending finger extending into said spiral groove, said finger being normally biased against one of said locking projections so as to prevent the drive spring from rotating the take-up spool;
a shutter plate normally covering said aperture;
a two position shutter trigger arm pivotally secured to the body;
a shutter spring connected between the shutter plate and the trigger arm;
a shutter lever connected to the trigger arm for moving the trigger arm from its first position to its second position, thereby causing the shutter to be tripped by the action of the shutter spring;
a reset spring located in the body which automatically forces the trigger arm back from its second position to its first position when the shutter lever is released and temporarily lifts the finger of the locking spring out of engagement with one of the locking projections so as to enable the drive spring to rotate the take-up spool until the finger engages the next locking projection in the spiral groove, said reset spring thereby causing both the shutter plate to be reset by the action of the shutter spring and the film to be advanced automatically after the shutter lever is released; and
a removable cover attached to the top of the body.

2. The camera of claim 1 further including a picture number opening in said cover; and
a circular array of numerals located on the top of and concentric with the take-up spool, one of the numerals being visible through said opening and indicating the position of said film within the camera.

3. The camera of claim 2 further including a ring integrally molded on the inside of said cover, said ring being concentric with said take-up spool and surrounding the picture number opening; and
a circular groove formed in said take-up spool, said ring extending into said circular groove, thereby preventing stray light from entering the camera.

4. The camera of claim 1 wherein the lens is held in place over said aperture by a plastic lens frame secured to the outside of the body by means of friction.

5. The camera of claim 1 further including a transparent plastic viewfinder window secured to the body by means of friction.

6. The camera of claim 1 further including at least one removable clip member for securing the cover to the body.

7. The camera of claim 1 together in combination with:
a box within which said camera is located, said box including a viewfinder opening corresponding to the rear viewfinder opening in the camera and a hinged front cover which when opened exposes the lens, front viewfinder opening and shutter lever of the camera.

8. The camera of claim 2 together in combination with:
a mailing box within which said camera is located, said mailing box including a viewfinder opening corresponding to the rear viewfinder opening in the camera, a picture number opening corresponding to the picture number opening in the camera cover, and a hinged front cover which when opened exposes the lens, front viewfinder opening and shutter lever of the camera; and
an adhesive label for securing the front cover in a closed position for mailing purposes.

9. The camera of claim 1 wherein said body includes an integrally molded spring tension post located in the film take-up area within the take-up spool, wherein one end of the drive spring is biased against the take-up spool and the other end of the drive spring is biased against the tension post.

* * * * *